US012573076B2

(12) United States Patent
Sasatani et al.

(10) Patent No.: US 12,573,076 B2
(45) Date of Patent: Mar. 10, 2026

(54) POSITION MEASUREMENT SYSTEM

(71) Applicant: Hitachi, Ltd., Tokyo (JP)

(72) Inventors: So Sasatani, Tokyo (JP); Tsuyoshi Kitamura, Tokyo (JP)

(73) Assignee: Hitachi, Ltd, Tokyo (JP)

(*) Notice: Subject to any disclaimer, the term of this patent is extended or adjusted under 35 U.S.C. 154(b) by 308 days.

(21) Appl. No.: 18/558,032

(22) PCT Filed: Feb. 18, 2022

(86) PCT No.: PCT/JP2022/006682
§ 371 (c)(1),
(2) Date: Oct. 30, 2023

(87) PCT Pub. No.: WO2022/239355
PCT Pub. Date: Nov. 17, 2022

(65) Prior Publication Data
US 2024/0249427 A1     Jul. 25, 2024

(30) Foreign Application Priority Data

May 14, 2021     (JP) .................................. 2021-082447

(51) Int. Cl.
*G06T 7/70* (2017.01)

(52) U.S. Cl.
CPC ...... *G06T 7/70* (2017.01); *G06T 2207/30252* (2013.01)

(58) Field of Classification Search
CPC ........................ G06T 7/70; G06T 2207/30252
See application file for complete search history.

(56) References Cited

FOREIGN PATENT DOCUMENTS

| JP | 2020-052600 A | | 4/2020 |
|----|---------------|---|--------|
| JP | 2020129319 A | * | 8/2020 |
| JP | 2020143901 A | * | 9/2020 |
| JP | 2020193954 A | * | 12/2020 |

OTHER PUBLICATIONS

International Search Report, PCT/JP2022/006682, May 10, 2023, 2 pgs.

* cited by examiner

*Primary Examiner* — Wednel Cadeau
(74) *Attorney, Agent, or Firm* — Volpe Koenig

(57) ABSTRACT

A position measurement system comprises: a plurality of imaging means for capturing images of an own position-detecting measured object having an own position detection unit and another measured object having no own position detection unit; an own position measurement means for obtaining the position of the own position-detecting measured object on the basis of own position information from the own position detection unit; an image analysis means for estimating the positions of the own position-detecting measured object and the other measured object for each of the images; and a position determination means which compares the position of the own position-detecting measured object measured by the own position measurement means with the position of the own position-detecting measured object estimated by the image analysis means for each of the captured images, and which determines one of the positions of the other measured object estimated for the respective captured images.

11 Claims, 10 Drawing Sheets

| TARGET | CLASS | SCORE | POSITION |
|--------|-------|-------|----------|
| 32a | Person | 0.8 | $\left(x_g^1, y_g^1\right)$ |
| 32b | Car | 0.9 | $\left(x_g^2, y_g^2\right)$ |

| TARGET | CLASS | SCORE | POSITION | MEASUREMENT ERROR |
|--------|-------|-------|----------|-------------------|
| 32a | Person | 0.8 | $\left(x_g^1, y_g^1\right)$ | $\sigma_1$ |
| 32b | Car | 0.9 | $\left(x_g^2, y_g^2\right)$ | $\sigma_2$ |
| 32b | - | - | $\left(x_g^3, y_g^3\right)$ | 0 |

55

POSITION MEASUREMENT SYSTEM

TECHNICAL FIELD

The present invention relates to a position measurement system that measures a position of a moving measurement target object, and particularly relates to a position measurement system that measures a position of a measurement target object by using an imaging means.

BACKGROUND ART

In recent years, a decrease in the labor population has led to a growing hope for automatized or autonomous work systems that are expected to solve a labor shortage problem and improve productivity. For example, in a work area like a factory, where moving measurement target objects, such as workers, autonomously moving vehicles, and robots, are present together, the position of a measurement target object is measured, and a movable range in which the measurement target object can move safely (work-allowed area, safety area, etc.) is presented. This allows building a work system that offers both safety and productivity.

To manage such a system smoothly, measuring the position of a measurement target object always with high accuracy is essential. For example, when a measurement target object on autonomous move (vehicle, robot, etc.) is present, allowing the measurement target object to move safely is required. To meet this requirement, in general, the measurement target object is equipped with sensors, such as a camera and light detection and ranging (LiDAR), to detect a structure or an obstacle (e.g., work machine, pillar, wall surface, furniture, and the like) present around the measurement target object and measure a positional relationship with the structure or the obstacle.

However, merely equipping the measurement target object with sensors does not solve a problem that the sensor do not cover a blind spot or the like caused by a structure or an obstacle and therefore leads to difficulty in measuring many structures and obstacles in the work area. In this case, fixed sensors, such as cameras and LiDARs, are arranged around the work area as well to measure the work area, and measurement results from these sensors are integrated with measurement results from the sensors incorporated in the measurement target object. By this approach, the positions of many structures and obstacles can be measured with high accuracy.

However, at a work site, which varies in form, many sensors do not necessarily produce accurate measurement results because of various disturbances (e.g., disturbance at an optical system), and therefore measurement data obtained by each sensor need to be chosen or discarded according to an environmental situation of the work site. For example, JP 2020-52600 A (PTL 1) discloses the following technique.

PTL 1 discloses a technique of obtaining images of objects (imaging target objects) that are captured by cameras from different viewpoints to estimate a position of each object, calculating a degree of mutual concealment of objects for each camera, based on the viewpoint of each camera and the position of each object, selecting a camera to be used to identify each object, based on the degree of concealment, and identifying each object, based on an image captured by the camera selected for each object.

CITATION LIST

Patent Literature

PTL 1: JP 2020-52600 A

SUMMARY OF INVENTION

Technical Problem

As described above, in the field of the position measurement system, measuring the position of the measurement target object always with high accuracy is strongly demand. However, PTL1 describes the technique by which an image captured by a camera is selected based on the degree of concealment, and does not take into consideration a method of improving the measurement accuracy of the position of the object by using an image captured by a camera.

An object of the present invention is to provide a position measurement system that in an area where a plurality of measurement target objects are present, can measure a position of each measurement target object with high accuracy.

Solution to Problem

A first feature in accordance with the present invention provides a position measurement system including: a plurality of imaging means that capture an image of an own position detecting measurement target object having an own position detection unit and an image of a different measurement target object having no own position detection unit; an own position measurement means that obtains an own position of the own position detecting measurement target object, based on own position information from the own position detection unit; an image analyzing means that estimates respective positions of the own position detecting measurement target object and the different measurement target object for each of captured images from the plurality of imaging means; and a position determining means that compares the own position of the own position detecting measurement target object, the own position being measured by the own position measurement means, with the estimated position of the own position detecting measurement target object, the estimated position being obtained by the image analyzing means for each of captured images, and that according to a result of the comparison, selects and determines one of estimated positions of the different measurement target object for each of the captured images.

A second feature in accordance with the present invention provides a position measurement system including: a plurality of imaging means that capture an image of an own position detecting measurement target object having an own position detection unit and an image of a different measurement target object having no own position detection unit; an own position measurement means that obtains an own position of the own position detecting measurement target object, based on own position information from the own position detection unit; a measurement target object position estimating means that estimates respective positions of the own position detecting measurement target object and the different measurement target object, from a captured image from each imaging means; a measurement error estimating means that compares the own position of the own position detecting measurement target object, the own position being measured by the own position measurement means, with the estimated position of the own position detecting measurement target object, the estimated position being estimated by the measurement target object position estimating means, to obtain a measurement error and that, based on the measurement error, estimates a measurement error of the different measurement target object; and a position determining means that selects the different measurement target object with a measurement error estimated by the measurement error estimating means being small to determine an estimated position of the different measurement target object.

Advantageous Effects of Invention

According to the present invention, the position of the different measurement target object having no own position detection unit can be obtained accurately and therefore position estimation accuracy can be improved.

DESCRIPTION OF EMBODIMENTS

Hereinafter, embodiments of the present invention will be described in detail with reference to the drawings. The present invention is, however, not limited to the following embodiments, and various modifications and application examples are included in the technical concept of the present invention.

First Embodiment

Figure 1:
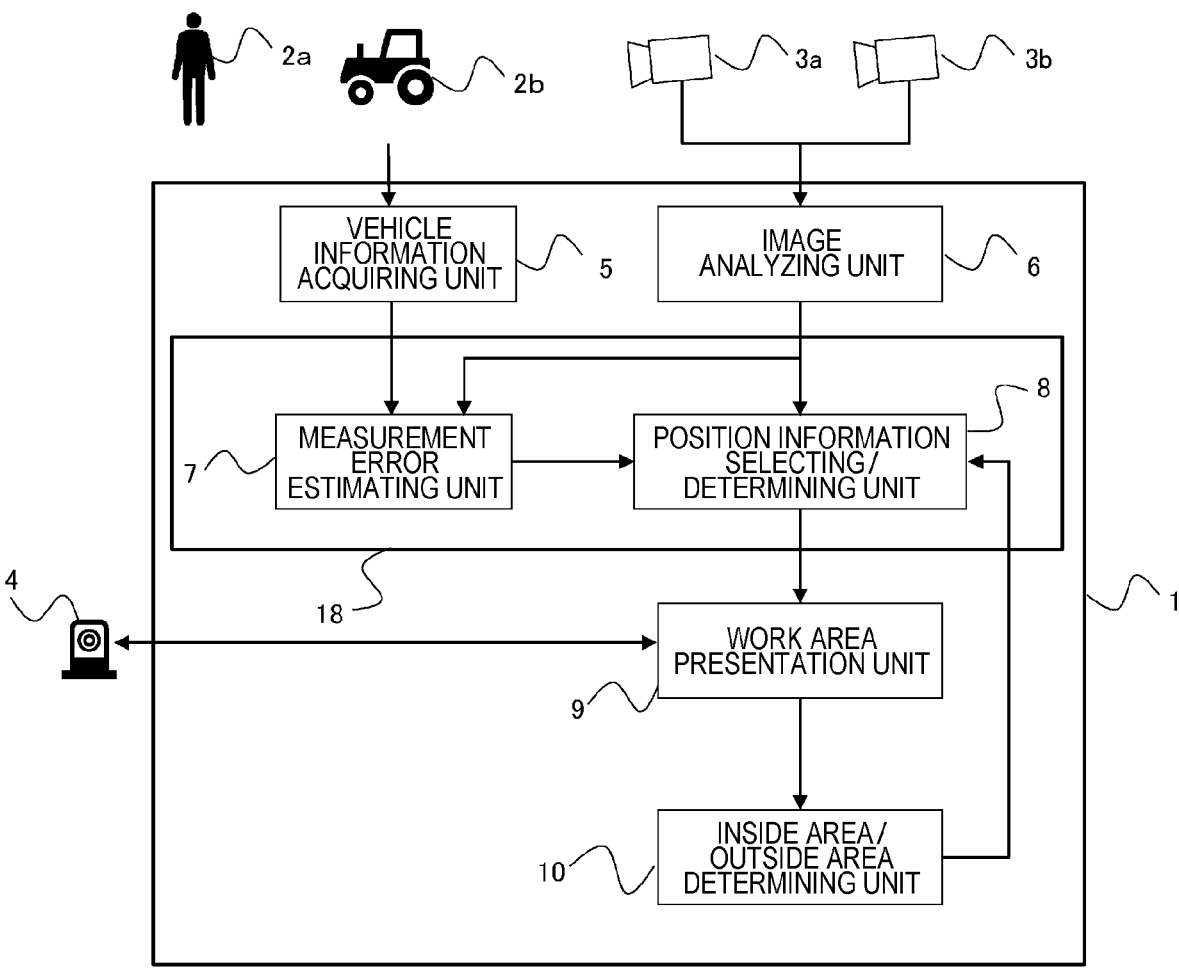
FIG. 1 is a functional block diagram showing functions of a position measurement system according to a first embodiment of the present invention.

FIG. 1 is a functional block diagram showing functions of a position measurement system according to a first embodiment of the present invention. In this embodiment, a case where a plurality of cameras are used as position estimating means will be described. The position estimating means are, however, not limited to these cameras, and may be provided as other sensor means, such as a stereo camera and a distance sensor like LiDAR, and may also be provided as a combination of different sensors.

A position measurement system 1 shown in FIG. 1 includes a vehicle 2b capable of acquiring own position information (own position detecting measurement target object described in the claims), a worker 2a (different measurement target object described in the claims), the vehicle 2b and the worker 2a being present together in a work area, and a plurality of cameras 3a and 3b (imaging means described in the claims, which will hereinafter be referred to as infra-cameras) installed in the work area, where respective positions of the vehicle 2b and the worker 2a are measured. The number of the infra-cameras is not limited to two. In the following description, an expression "measurement target object" may be additionally used to refer to the vehicle 2b and the worker 2a.

The vehicle 2b capable of acquiring own position information can obtain its own position accurately by an own position detection unit, which is, for example, a GPS sensor's position detection function or an image pattern recognition function. A different measurement target object incapable of acquiring own position information, such as the worker 2a, has its position estimated based on captured images from the infra-cameras 3a and 3b. Obviously, an own position detecting measurement target object too has its position estimated based on captured images from the infra-cameras 3a and 3b. This estimated position is used to obtain a measurement error, which will be described later.

Using the position of each measurement target object that is estimated by the position measurement system 1, the map display device 4 can present a work-allowed area (which is a specific area, such as a safe area and a dangerous area) in the work area by a projection mapping method. This requires that position information on the measurement target object be accurate. Projection mapping is an example of a mapping method and can be applied to other work systems as well.

Now, the measurement target object (vehicle 2b) capable of acquiring own position information can basically obtain its accurate position, whereas the different measurement target object (worker 2a) incapable of acquiring own position information has its position estimated based on captured images from the infra-cameras 3a and 3b. In this case, different measurement errors result depending on which of respective captured images from the infra-cameras 3a and 3b is used for estimation of the position. This embodiment is characterized in that by selecting a captured image with a small measurement error, the position of the different measurement target object (worker 2a) incapable of acquiring own position information is determined.

In FIG. 1, the position measurement system 1 includes a vehicle information acquiring unit 5, an image analyzing unit 6, a measurement error estimating unit 7, a position information selecting/determining unit 8, a work area presentation unit 9, and an inside area/outside area determining unit 10, which are functional blocks. The measurement error estimating unit 7 and the position information selecting/determining unit 8 are combined to constitute a position determining unit 18. Each functional block is implemented by a computer having a processor, a main storage, and an external storage. An outline of each functional block shown in FIG. 1 will then be described.

The vehicle information acquiring unit 5 has a function of acquiring own position information on the vehicle 2 and, when an external sensor is incorporated in the system, acquiring measurement information from the sensor as well. The image analyzing unit 6 has a function of analyzing captured images acquired from the infra-cameras 3a and 3b, thereby measuring respective positions of the worker (different measurement target object) 2a and the vehicle (own position detecting measurement target object) 2b.

The measurement error estimating unit 7 has a function of comparing an own position of the vehicle (own position detecting measurement target object) 2b, the own position being acquired from the vehicle information acquiring unit 5, with an estimated position of the vehicle (own position detecting measurement target object) 2b, the estimated position being acquired from the image analyzing unit 6, to estimate a measurement error in measurement of the vehicle (own position detecting measurement target object) 2b that is made by the infra-cameras 3a and 3b.

The position information selecting/determining unit 8 has a function of selecting and determining an estimated position to be finally used in the position measurement system 1 out of estimated positions of the worker (different measurement target object) 2a that are acquired by the image analyzing unit 6, using an estimated measurement error.

The work area presentation unit 9 has a function of analyzing position information on the vehicle (own position detecting measurement target object) 2b and the worker (different measurement target object) 2a, the position information being acquired by the position information selecting/determining unit 8, and causing the map display device 4 to present a movable range (which is a specific area, such as a work-allowed area and a safety area) for the vehicle (own position detecting measurement target object) 2b and the worker (different measurement target object) 2a in the work area. The inside area/outside area determining unit 10 has a function of determining whether the vehicle (own position detecting measurement target object) 2b and the worker (different measurement target object) 2a are present in a presented specific area and feeding the determination result back to the position information selecting/determining unit 8.

The function of each of the functional blocks, i.e., the vehicle information acquiring unit 5, the image analyzing unit 6, the measurement error estimating unit 7, the position information selecting/determining unit 8, the work area presentation unit 9, and the inside area/outside area determining unit 10 will then be described in detail.

Figure 2:
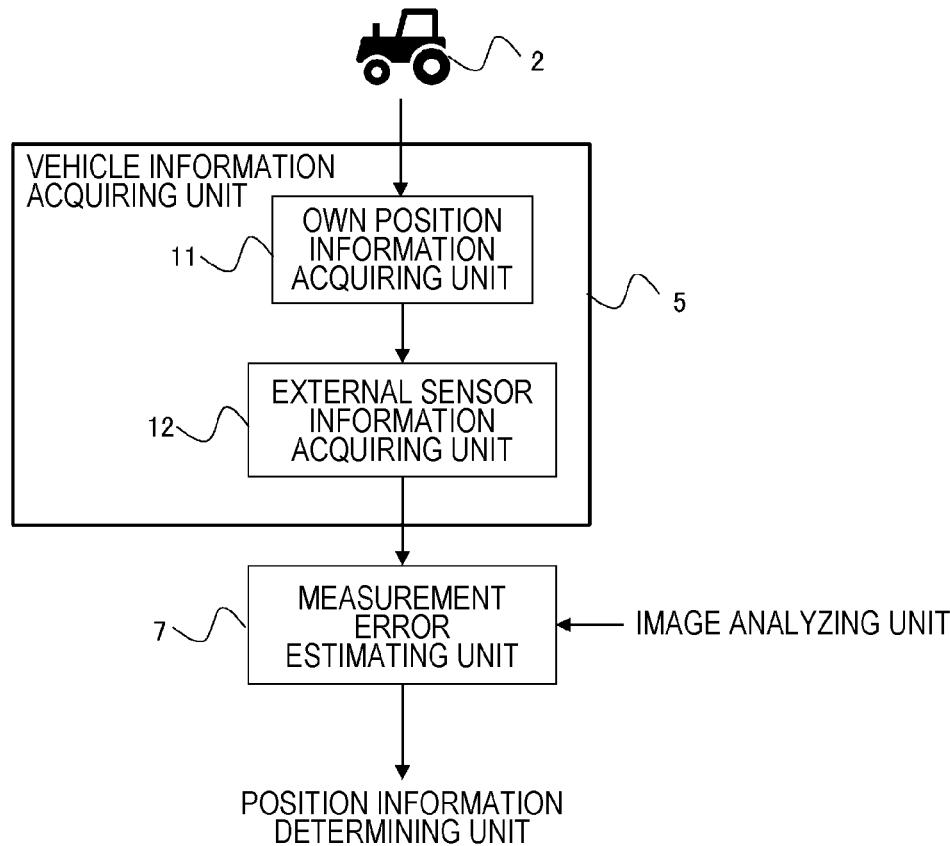
FIG. 2 is a configuration diagram of a vehicle information acquiring unit shown in FIG. 1.

FIG. 2 depicts the vehicle information acquiring unit 5 as a functional block. The vehicle information acquiring unit 5 includes an own position information acquiring unit 11 that acquires own position information by a GPS sensor or the like installed in the vehicle 2, and an external sensor information acquiring unit 12 that acquires measurement information from an external sensor incorporated in the vehicle 2. Hereinafter, functions of the own position information acquiring unit 11 and the external sensor information acquiring unit 12 will be described.

Figure 3:
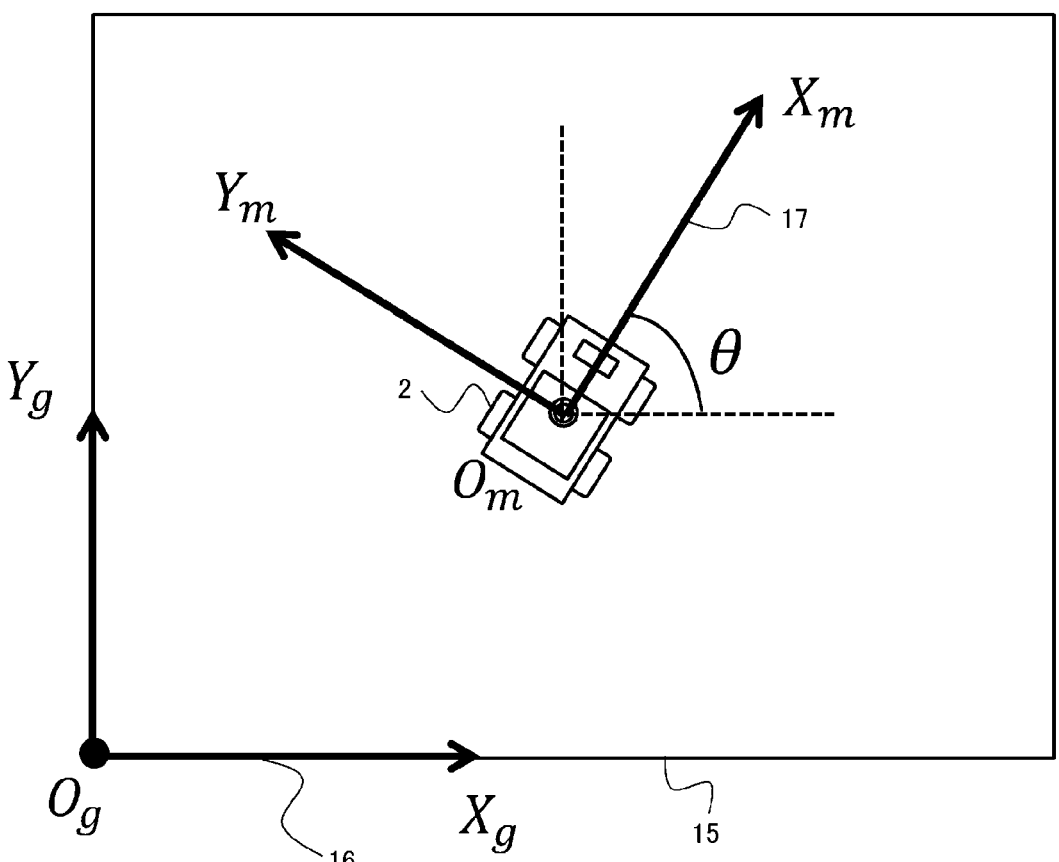
FIG. 3 is an explanatory diagram for explaining a function of an own position information acquiring unit.

The own position information acquiring unit 11 will be described with reference to FIG. 3. In FIG. 3, with respect to a work area map 15 to which the position measurement system 1 is applied, position information and the like from the vehicle 2, the infra-cameras 3a and 3b, and the map display device 4, the position information and the like being used in the position measurement system 1, is calibrated in advance so that position information is handled in a common coordinate system 16 with "Og" defined as its origin.

Own position information acquired by the own position information acquiring unit 11 includes position information on the origin "Om" of a vehicle coordinate system 17 in the common coordinate system 16 shown in FIG. 3, and an inclination "θ" of the vehicle coordinate system 17 against the common coordinate system 16, the inclination "θ" indicating the direction of the vehicle.

These pieces of information are acquired by a GPS sensor or by a technique like simultaneous localization and mapping (SLAM) using a LiDAR or a camera installed in the vehicle 2b. A method of acquiring the information is not limited to specific one, and any method allowing acquisition of own position information on the vehicle 2b with high accuracy may be adopted.

In a case where the vehicle 2b is equipped with an external sensor, such as a camera or a LiDAR, the external sensor information acquiring unit 12 can acquire shape information on a structure present around the vehicle 2b, the shape information being acquired by the external sensor. For example, in a case where the vehicle 2b is equipped with a camera, the external sensor information acquiring unit 12 analyzes a captured image from the camera, as the image analyzing unit 6 analyzes images from the infra-cameras 3a and 3b, to obtain shape information on a nearby structure, thus can acquire position information. A position measurement method executed by the image analyzing unit 6 will be described later. In a case where the vehicle 2b is equipped with a distance sensor, such as a LiDAR, the external sensor information acquiring unit 12 analyzes measured three-dimensional point cloud information so as to acquire position information on a structure of a certain size or greater size in height.

When position information from the external sensor is position information on the vehicle coordinate system 17 with "Om" shown in FIG. 3 defined as its origin, the position information can be transformed into position information on the common coordinate system 16 by using own position information. When the vehicle 2b is not equipped with the external sensor, a configuration not including the external sensor information acquiring unit 12 (functional block) may be adopted. When the vehicle 2b is equipped with the external sensor, the types of a sensor and a measurement algorithm are not limited to particular one, and any sensor and algorithm that allow measurement of position information on a structure present around the vehicle 2b may be adopted.

Figure 4:
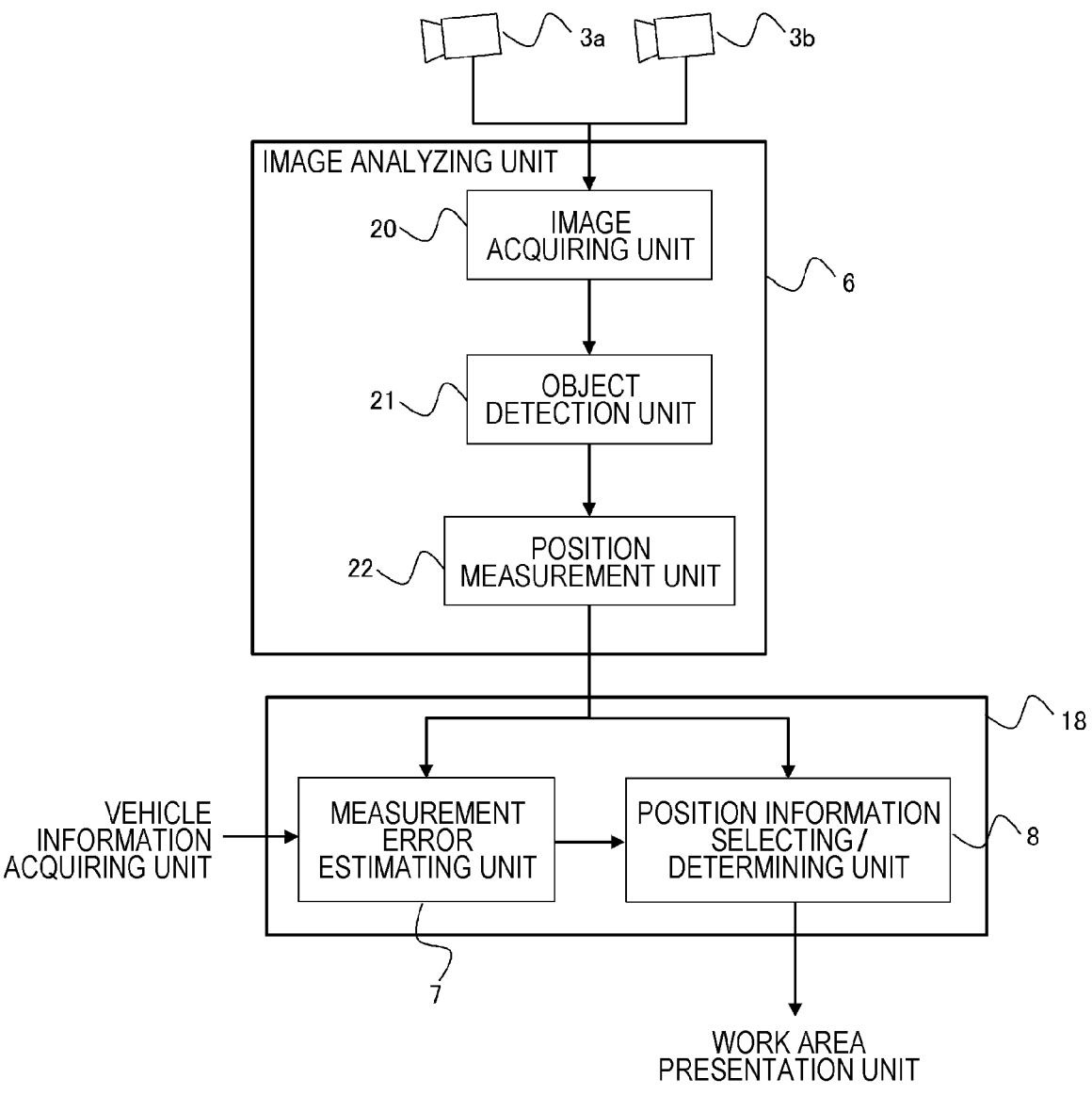
FIG. 4 is a configuration diagram for explaining a configuration of an image analyzing unit shown in FIG. 1.

FIG. 4 depicts the image analyzing unit 6 as a functional block. The image analyzing unit 6 includes an image acquiring unit 20 that acquires captured images from the infra-cameras 3a and 3b, an object detection unit 21 that applies an image recognition algorithm or the like to each captured image, thereby extracting an area of a measurement target object in the position measurement system 1, the area being present in the captured image, and position measurement unit 22 that acquires position information on the measurement target object, based on information on the area of the measurement target object that is present in an extracted image. Hereinafter, the object detection unit 21 and the position measurement unit 22 will be described in detail.

Figure 5:
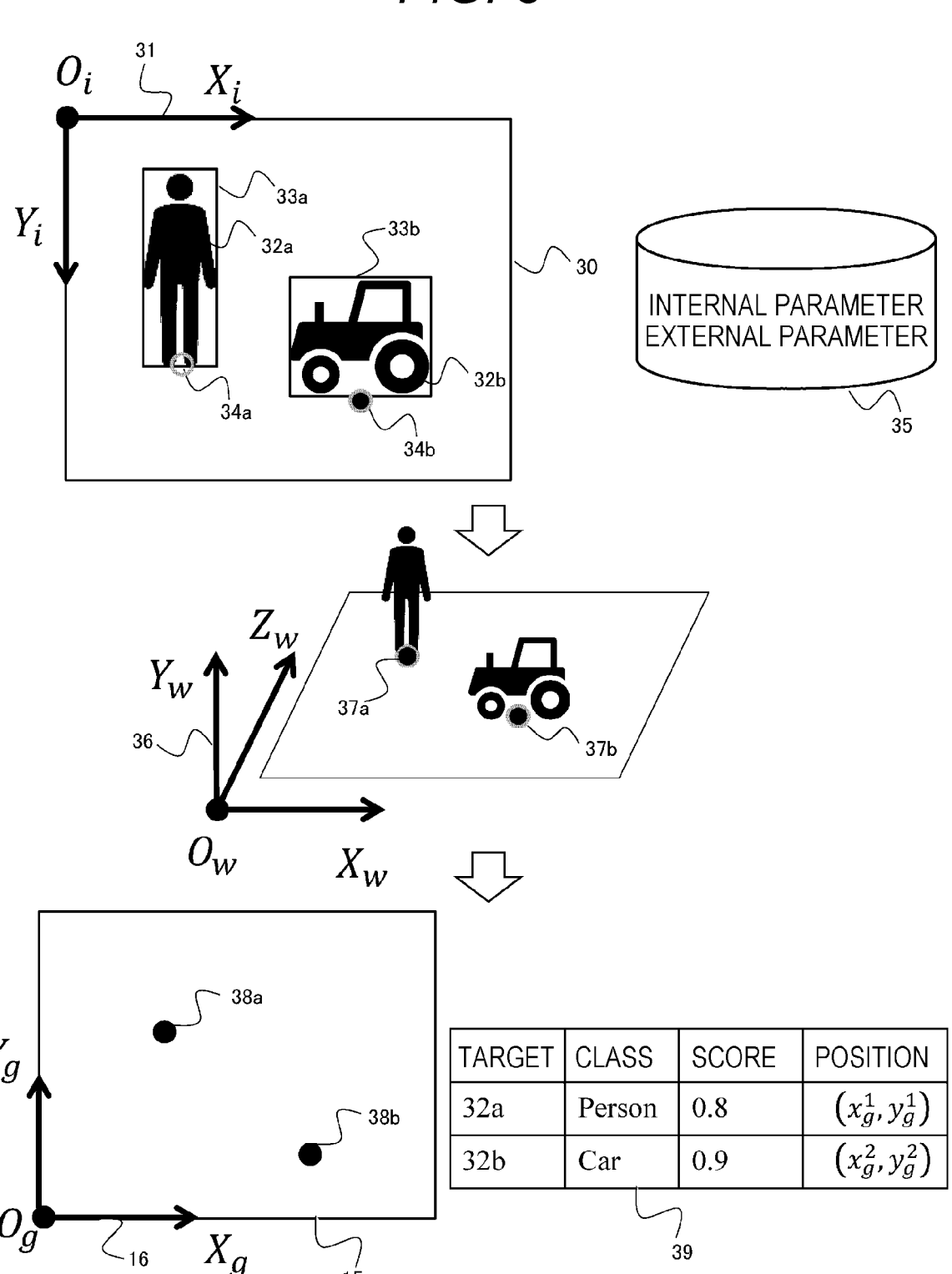
FIG. 5 an explanatory diagram for explaining functions of an object detection unit and a position measurement unit shown in FIG. 4.

The object detection unit 21 and the position measurement unit 22 will be described with reference to FIG. 5. In FIG. 5, a captured image 30 is a captured image acquired from the image acquiring unit 20. An image coordinate system 31 is a coordinate system with "Oi" defined as its origin, "Oi" being at the upper left corner of the image. A worker 32a and a vehicle 32b, which are measurement target objects, are encircled with detection frames 33a and 33b, respectively, which are estimated by the object detection unit 21, as areas including the measurement target objects in the image.

At the centers of lower ends the detection frames 33a and 33b, image coordinates 34a and 34b of the detection frames 33$a$ and 33$b$ are set, respectively. Camera parameters 35 are camera parameters of the infra-cameras 3$a$ and 3$b$ used to acquire the captured image. A world coordinate system 36 is a coordinate system with "Ow" defined as its origin, which the position measurement unit 22 creates by transforming the image coordinate system 31 using the camera parameters 35.

World coordinates 37$a$ and 37$b$ are world coordinates corresponding to the image coordinates 34$a$ and 34$b$, respectively. Coordinates 38$a$ and 38$b$ are set by transforming the world coordinates 37$a$ and 37$b$ into coordinates on the common coordinate system 16 and plotting the transformed coordinates on the work area map 15. Position information 39 is position information outputted from the position measurement unit 22.

The object detection unit 21 use a dictionary which allows detection of a measurement target object (the worker 2$a$ or the vehicle 2$b$) from an image created in advance from training data by machine learning or the like (pattern matching), thereby distinguishing and detecting the measurement target object (the worker 2$a$ or the vehicle 2$b$) present in a captured image. An algorithm used to generate the dictionary may be a commonly used algorithm, such as a convolutional neural network or AdaBoost, and is not limited to particular one. Any method other than the above methods that allows distinguishing and detecting the measurement target object from the captured image and estimating a circumscribed rectangle (bounding box) of the measurement target object may be adopted without any particular limitation.

The position measurement unit 22 transforms position information on the measurement target objects into position information on the world coordinate system 36 and the common coordinate system 16, based on the image coordinates 34$a$ and 34$b$ of the detection frames 33$a$ and 33$b$ of the measurement target objects, the image coordinates 34$a$ and 34$b$ being acquired by the object detection unit 21. Transformation from image coordinates into world coordinates is carried out by a common method using the camera parameters 35.

The camera parameter 35 are derived by ordinary camera calibration. By a method of manually giving the world coordinates system 36 corresponding to the image coordinates system 31 in advance, the camera parameters 35 can be estimated. As a method of transforming the world coordinates 37$a$ and 37$b$ into the common coordinates 38$a$ and 38$b$, a common method, such as executing calibration between the infra-cameras 3$a$ and 3$b$ and the work area map 15 in advance and carrying out the transformation using perspective transformation matrices, is adopted, and the method is not limited to particularly one.

By the above methods, the position measurement unit 22 acquires the position information 39 on the measurement target object (the worker 2$a$ or the vehicle 2$b$). The position information to be acquired includes three pieces of information on each of the measurement target objects 32$a$ and 32$b$, the information being titled "class information", "score", and "position". The class information is a result of identification of the measurement target object (the worker 2$a$ or the vehicle 2$b$) by the object detection unit 21, the score is an index indicating a probability of the measurement target object (the worker 2$a$ or the vehicle 2$b$) being present in the rectangles formed by the detection frames 33$a$ and 33$b$, and the position is a two-dimensional coordinate value of the measurement target object (the worker 2$a$ or the vehicle 2$b$) on the common coordinate system 16.

Figure 6:
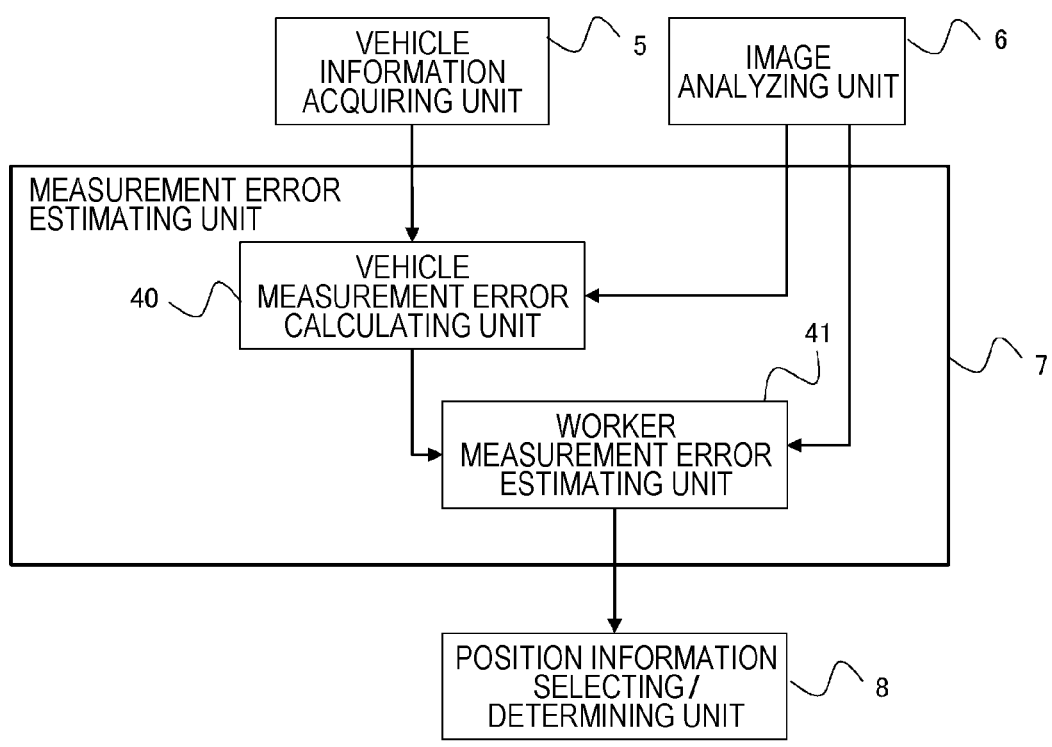
FIG. 6 is a configuration diagram of a measurement error estimating unit shown in FIG. 4.

FIG. 6 depicts the measurement error estimating unit 7 as a functional block. The measurement error estimating unit 7 includes a vehicle measurement error calculating unit 40 that compares information on the own position of the vehicle 2$b$, the information being acquired from the vehicle information acquiring unit 5, with information on an estimated position of the vehicle 2$b$ estimated by the image analyzing unit 6 to calculate a measurement error of the estimated position of the vehicle 2$b$, and a worker measurement error estimating unit 41 that, based on information on the calculated measurement error in measurement of the vehicle, estimates a measurement error of an estimated position of the worker 2$a$ estimated by the image analyzing unit 6. Hereinafter, the vehicle measurement error calculating unit 40 and the worker measurement error estimating unit 41 will be described in detail.

Figures 7A, 7B:
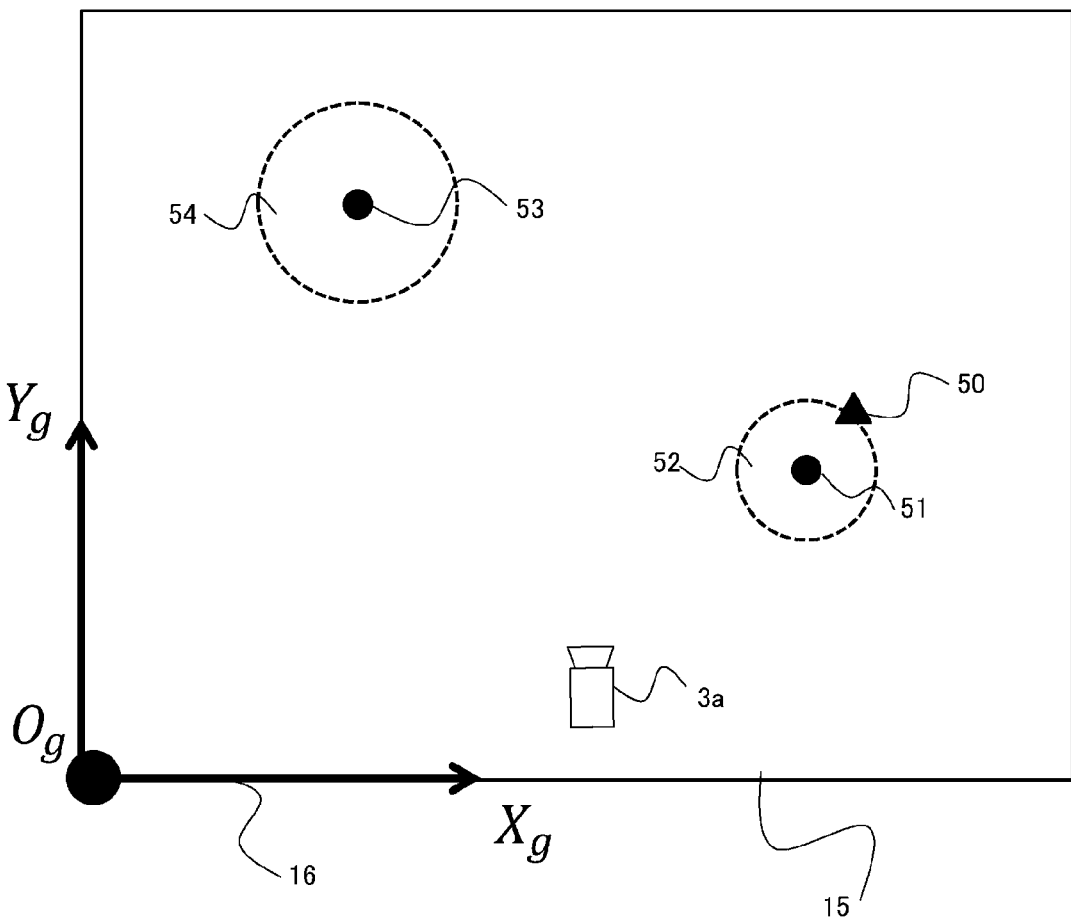
FIG. 7A is an explanatory diagram for explaining a vehicle measurement error calculating unit and a worker measurement error estimating unit shown in FIG. 6.
FIG. 7B is an explanatory diagram for explaining an example of a measurement error made by the vehicle measurement error calculating unit and the worker measurement error estimating unit of FIG. 6.

The vehicle measurement error calculating unit 40 and the worker measurement error estimating unit 41 will be described with reference to FIGS. 7A and 7B. In FIG. 7A, an own position 50 of the vehicle 2$b$ is own position coordinates $(x^3g, y^3g)$ of the vehicle 2$b$ on the common coordinate system 16, the own position coordinates $(x^3g, y^3g)$ being measured by the own position measurement means. An estimated position 51 of the vehicle 2$b$ is estimated position coordinates $(x^2g, y^2g)$ of the vehicle 2$b$ that are estimated by the image analyzing unit 6.

A measurement error $(\sigma_2)$ 52 is a measurement error calculated by comparing the own position 50 of the vehicle with the estimated position 51 estimated by the image analyzing unit 6. In FIG. 7A, an area of the measurement error is indicated by a broken line. An estimated position 53 of the worker 2$a$ is position information $(x^1g, y^2g)$ on the worker 2$a$ that is estimated by the image analyzing unit 6. A measurement error $(\sigma_1)$ 54 is a measurement error of the worker 2$a$ that is estimated from the measurement error 52 of the vehicle 2$b$. In FIG. 7A, an area of the measurement error is indicated by a broken line. As shown in FIG. 7B, output information 55 is finally outputted from the measurement error estimating unit 7.

The vehicle measurement error calculating unit 40 determines whether the own position 50 of the vehicle 2$b$ is present in an error area of the estimated position 51 of the vehicle 2$b$ outputted by the image analyzing unit 6. Determination methods include use of a Euclidean distance between the coordinates of the estimated position 51 of the vehicle 2$b$ and the coordinates of the own position 50 of the same, and are not limited to a particular method.

When the estimated position 51 of the vehicle 2$b$ estimated by the image analyzing unit 6 is not present, the measurement error cannot be measured, in which case the function of the position information selecting/determining unit 8 is executed. When the estimated position 51 of the vehicle 2$b$ estimated by the image analyzing unit 6 is present, a circular region with a radius being the Euclidean distance between the estimated position 51 and the own position 50 of the vehicle 2$b$ is determined to be the measurement error 52.

When the measurement error 52 is obtained, the worker measurement error estimating unit 41 estimates the worker position measurement error 54, from the measurement error 52 and the estimated position 53 of the worker 2$a$ that is estimated by the image analyzing unit 6. One estimation method is a method using information on a positional relationship between the infra-cameras 3$a$ and 3$b$ and each measurement target object.

Usually, a position measurement method using a camera has a disadvantage that the accuracy of measurement of a measurement target object at a position distant from the camera tends to decrease. For this reason, a specific method is adopted according to which the positions of the infra-cameras $3a$ and $3b$ on the common coordinate system $16$ are calculated in advance and the measurement error $52$ is linearly increased/decreased according to the Euclidean distance between respective positions of the infra-cameras $3a$ and $3b$ and respective estimated positions $51$ and $53$ of the measurement target objects (worker $2a$, vehicle $2b$). By this method, the circular area of the measurement error $54$ can be estimated.

For estimation of the circular area of the measurement error, methods different from the method of this embodiment, which use the Euclidean distance between respective positions of the infra-cameras $3a$ and $3b$ and respective estimated positions $51$ and $53$ of the measurement target objects (worker $2a$, vehicle $2b$) on the common coordinate system $16$, may also be used. Such methods include a method of utilizing y coordinate values on the image coordinate system $31$ and a method of estimating a distance estimation error of y coordinate values on the image coordinate system $31$ pixel by pixel, from information on an angle of view and resolution and utilizing the estimated distance estimation error for determining the rate of increase/decrease of the measurement error $52$. At estimation of the circular area of the measurement error, the class information may be taken into consideration, according to which a process of correcting the rate of increase/decrease of the measurement error according to the size of the measurement target object is added to the estimation process.

The measurement error estimating unit $7$ assigns information on the measurement errors $52$ and $54$ obtained by the above method, the information being denoted as "$\sigma_2$" and "$\sigma_1$", to position information outputted from the image analyzing unit $6$ and also adds own position information $(x^3g, y^3g)$, thus inputting information indicated by the output information $55$ to the position information selecting/determining unit $8$ in the subsequent stage.

The position information selecting/determining unit $8$, which receives input of captured images from the infra-cameras $3a$ and $3b$, finally determines an estimated position of the measurement target object (worker $2a$), the estimated position being used in the position measurement system $1$, from an estimated position and a measurement error of each measurement target object (worker $2$) that are outputted from the image analyzing unit $6$ and the measurement error estimating unit $7$.

A method of determining the estimated position will then be described. It should be noted that measurement errors can be obtained by the method described above.

First, estimated positions of the measurement target object (the worker $2a$ in this case) on the common coordinate system $16$, the estimated positions being measured by two different infra-cameras $3a$ and $3b$, are extracted. Subsequently, from the two estimated positions, a Euclidean distance between these estimated positions is calculated, and when the calculated Euclidean distance is equal to or smaller than a given distance threshold and the classes corresponding to the estimated positions are the same, the measurement target objects are determined to be the same measurement target object (the worker $2a$ in this case).

Then, measurement errors $(\sigma_1)$ of estimated positions of the measurement target objects (worker $2a$) determined to be the same measurement target object, the measurement errors $(\sigma_1)$ being obtained for each of the infra-cameras $3a$ and $3b$, are compared, and an estimated position with a smaller measurement error $(\sigma_1)$ is selected as an estimated position with high reliability. These processes are executed on measurement target objects (worker $2a$) in all captured images from the infra-cameras $3a$ and $3b$ to finally select and determine an estimated position, which is outputted as an estimated position with high reliability.

In this embodiment, own position information on the vehicle $2b$ is always treated as "true", a measurement error is estimated therefrom, and the final estimated position of the worker $2a$ is selected. A different method, however, may also be adopted, according to which the reliability of the own position information on the vehicle $2b$ is estimated, and when the reliability is low, a Euclidean distance between two estimated positions is calculated, and when the calculated Euclidean distance is equal to or smaller than a given distance threshold and the classes corresponding to the estimated positions are the same, an average value of measurement errors is used.

A method of calculating the reliability of own position information on the vehicle is adopted in a case of, for example, using position information from the GPS sensor. In this case, because information on structures is embedded in an analysis of captured images and a work area map in advance, the detection sensitivity of the GPS sensor drops when the vehicle $2$ moves under roofs or near various structures, and therefore the reliability of own position information is estimated lower by the method of calculating the reliability.

Another method may also be used, according to which, with the positions of the infra-cameras $3a$ and $3b$ on the common coordinate system $16$ being obtained in advance, an estimated position of the measurement target object close to the infra-cameras $3a$ and $3b$ is determined to be an estimated position with high reliability and for that reason, an estimated position obtained from the infra-camera close to the measurement target object is selected.

Further, a final estimated position may be selected by also using information other than a measurement error estimated from own position information on the vehicle $2b$. For example, in a situation where a shadow of the measurement target object is formed by sunlight or the like, if such a shadow is included in the detection frames $33a$ and $33b$ created by object detection by the image analyzing unit $6$, it results in a drop in measurement accuracy. To avoid such a case, information on a photographing time, a positional relationship between the sun and the infra-cameras $3a$ and $3b$, and the like is taken into consideration and a method of selecting estimated positions of captured images from the infra-cameras $3a$ and $3b$, the method being expected to allow less measurement error and less influence of the shadow, may be used.

Still another method may also be used. According to this method, the image analyzing unit $6$ analyzes, along the time series, information on density between measurement target objects, the density being estimated from estimated positions of the measurement target objects on the common coordinate system $16$, and position information on the measurement target objects on the common coordinate system $16$, thereby acquiring track information on the measurement target objects, from which concealment information on the measurement target objects is estimated. Together with this concealment information, information on the postures and actions of the measurement target objects that are recognized by applying an image processing algorithm to captured images is taken into consideration and then final position information is selected.

Furthermore, in addition to the above-mentioned information, information that is considered to affect the accuracy of estimated positions of measurement target objects and that can be acquired by analyzing the estimated position and captured image of each measurement target object on the common coordinate system 16 may also be used.

Figure 8:
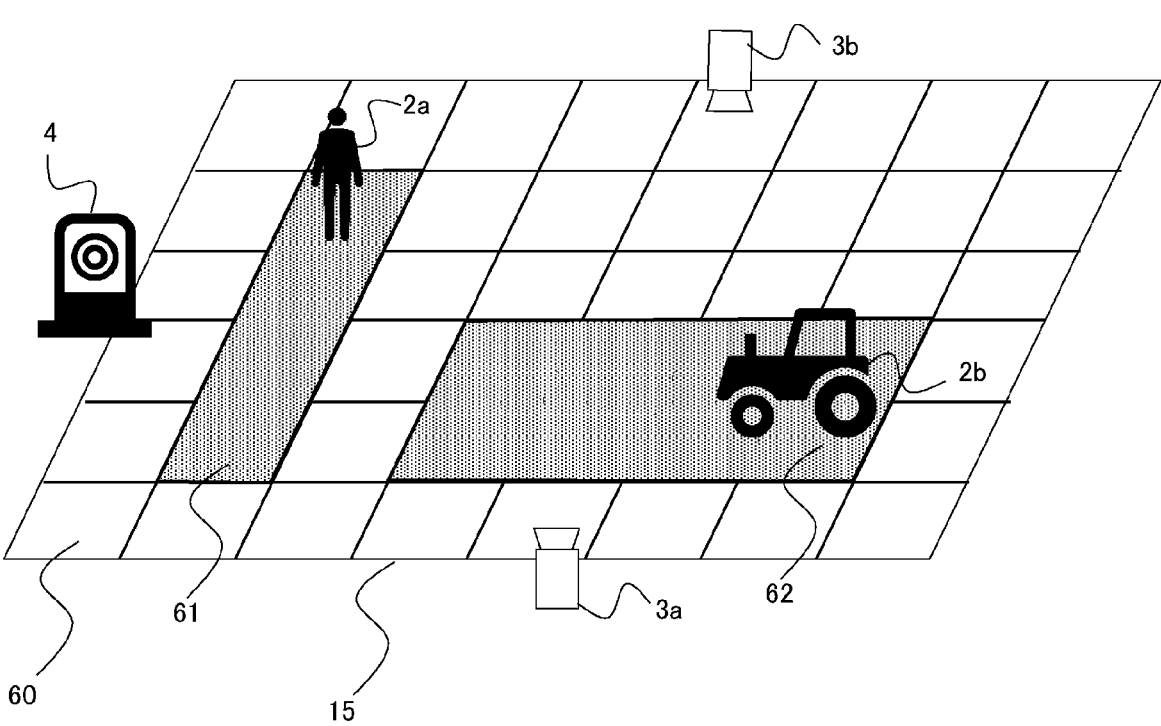
FIG. 8 is an explanatory diagram for explaining a work area presentation unit shown in FIG. 1.

The work area presentation unit 9 will then be described with reference to FIG. 8. In FIG. 8, in the work area map 15, divided areas 60 are formed by dividing the whole map in advance into divided areas each having a given size. The map display device 4 displays a work-allowed area 61 for the worker 2a on an actual work area surface. The map display device 4 displays also a work-allowed area 62 for the vehicle 2b on the actual work area surface. These work-allowed areas 61 and 62 are determined, based on estimated positions of the worker 2a and the vehicle 2i b.

To display the work-allowed areas for the worker 2a and the vehicle 2b in a situation where the measurement target objects, such as the worker 2a and the vehicle 2b in a work area, are present together, based on information on estimated positions outputted from the position information selecting/determining unit 8, the work area presentation unit 9 causes the map display device 4 to display (projection mapping) the work-allowed areas on the actual work area surface.

When the worker 2a comes out of the work-allowed area, an alarm is issued. When the vehicle 2b comes out of the work-allowed area, a stop instruction is transmitted. Specific processes will then be described.

First, the entire work area is divided into small divided areas 60 each having a size of, for example, "1 m×1 m". Subsequently, a divided area 60 including the position (one point) of the measurement target object (worker 2a, vehicle 2b) is selected, and the selected divided area 60 and divided areas 60 around the selected divided area are determined to be a part of the work-allowed area, according to the size of class information on the measurement target object (worker 2a, vehicle 2b).

Then, by comparison with an estimated position of each measurement target object (worker 2a, vehicle 2b) measured in the past, the moving direction and the speed of the measurement target object (worker 2a, vehicle 2b) in future are estimated, and a direction in which the work-allowed area is expanded is determined according to the moving direction while the number of divided areas 60 that expand the work area is determined according to information on the speed. Finally, the map display device 4, which is calibrated in advance with the common coordinate system 16, displays the determined work-allowed area on the actual work area surface.

A method of determining the work-allowed area is not limited to the above method, and any algorithm allowing prediction of an action of the measurement target object (worker 2a, vehicle 2b) may be adopted. In this embodiment, the map display device 4 is used to display the work-allowed area. The work-allowed area, however, is displayed not only by the map display device 4 but may be displayed by a light-emitting element, such as a display or a light, embedded in advance in the work area surface. The worker 2a may carry a display device and display the work-allowed area on the display device.

Further, the worker 2a may wear a head-mounted display (so-called VR goggles) and display a virtual work-allowed area on the display. Using such a head-mounted display having a function of creating an augmented reality, in which the work-allowed area is superimposed in the surrounding environment, allows the worker 2a to acquire information equivalent to information displayed on the work area surface, despite displaying nothing on the work area surface. This allows the worker 2a to suppress a drop in work efficiency that results when the work-allowed area needs to be displayed on a portable display device.

Figure 9:
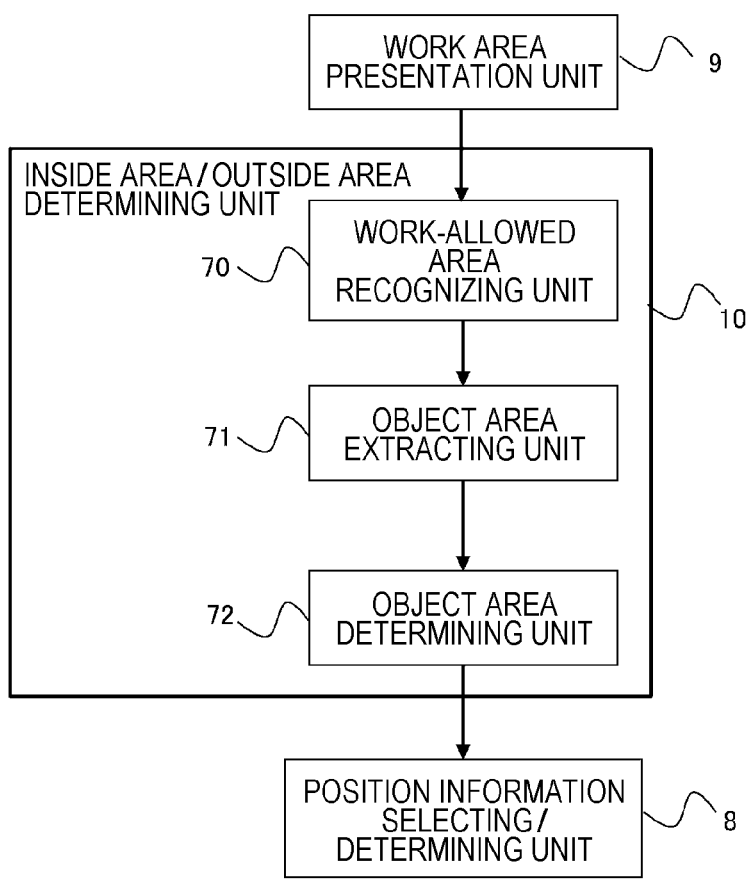
FIG. 9 is a configuration diagram of an inside area/outside area determining unit shown in FIG. 1.

FIG. 9 depicts the inside area/outside area determining unit 10 as a functional block. The inside area/outside area determining unit 10 includes a work-allowed area recognizing unit 70 that recognizes a work-allowed area presented by the map display device 4, the work-allowed area being extracted from captured images from the infra-cameras 3a and 3b by analyzing the captured images, an object area extracting unit 71 that extracts an object area including the measurement target object (worker 2a, vehicle 2b), based on a difference between captured images from the infra-cameras 3a and 3b and a background image held in advance, and an object area determining unit 72 that determines whether the object area is present in the work-allowed area. Hereinafter, the work-allowed area recognizing unit 70, the object area extracting unit 71, and the object area determining unit 72 will be described.

The work-allowed area recognizing unit 70 recognizes an area of the work-allowed area, from a captured image. Methods of recognizing the work-allowed area include a method of extracting the work-allowed area from a captured image, based on color information on divided areas presented in advance by the map display device 4, and a method of roughly estimating the position of the work-allowed area on the captured image, based on information on the position and size of the work-allowed area that is determined by the work area presentation unit 9, and then extracting the work-allowed area by utilizing the color information and the like.

The object area extracting unit 71 holds a background image captured in advance by the infra-cameras 3a and 3b and executes a binarization process on a difference between the background image and a newly inputted captured image, thereby acquiring a rectangular object area where the measurement target object (worker 2a, vehicle 2b) is present. Then, based on position information on the measurement target object that is provided by the infra-cameras 3a and 3b and information on the rectangular shape of the detection frames 33a and 33b, both information being outputted by the image analyzing unit 6, to which object area the measurement target object (worker 2a, vehicle 2b) belongs is recognized.

For extraction of the object area, a method different from the method of acquiring the background image may be adopted. For example, a method using inter-frame difference processing or the like may be adopted, and any method allowing extraction of an area including the measurement target object from the captured image may be adopted.

The object area determining unit 72 outputs "1" when a lower end part of an object area extracted from a captured image from the infra-camera 3a or 3b is included in the work-allowed area, while outputs "0" when the lower end part is not included in the work-allowed area. When "1" is outputted for all captured images, it is determined that the object area is included in the work-allowed area, and this determination result is fed back to the position information selecting/determining unit 8. Holding the fed backed determination result, the position information selecting/determining unit 8 use the determination result when finally determining position information at the next frame and other frames to follow.

For example, in a situation where each estimated position of a certain measurement target object (worker 2a, vehicle 2b) that is estimated by the same infra-cameras is selected consecutively as a final estimated position but the inside area/outside area determining unit 10 determines that the measurement target object (worker 2a, vehicle 2b) is not present in the work-allowed area, an estimated position estimated by infra-cameras 3a and 3b that are second to the above infra-cameras 3a and 3b in smallness of measurement error is used as the final estimated position.

When the object area determining unit 72 outputs "0" in a case where the lower end part of the object area is not included in the work-allowed area, information indicating to which extent the lower end part of the object area sticks out of the work-allowed area may be calculated and fed back to the position information selecting/determining unit 8, as a correction amount.

When using the estimated position estimated by infra-cameras 3a and 3b, as the final estimated position in the next frame and other frames to follow, the position information selecting/determining unit 8, which receives the correction amount fed back thereto, may use the following methods: a method of outputting an estimated position corrected by the above correction amount; and a method of correcting estimated positions estimated by the infra-cameras 3a and 3b, the estimated positions being inputted to the position information selecting/determining unit 8, by using the correction amount in several frames, and then determining which estimated position is to be used as the final estimated position.

The position measurement system according to this embodiment includes: a plurality of imaging means that capture an image of an own position detecting measurement target object having an own position detection unit and an image of a different measurement target object having no own position detection unit; an own position measurement means that obtains an own position of the own position detecting measurement target object, based on own position information from the own position detection unit; an image analyzing means that estimates respective positions of the own position detecting measurement target object and the different measurement target object for each of captured images from the plurality of imaging means; and a position determining means that compares the own position of the own position detecting measurement target object, the own position being measured by the own position measurement means, with the estimated position of the own position detecting measurement target object, the estimated position being obtained by the image analyzing means for each of captured images, and that according to a result of the comparison, selects and determines one of estimated positions of the different measurement target object for each of the captured images.

According to this configuration, the position of the measurement target object having no own position detection unit can be obtained accurately and therefore position estimation accuracy can be improved.

In addition, according to this embodiment, it is clearly understood from the above description that even when the measurement accuracy of the infra-cameras drops due to the influence of shadows created by sunlight and of shading by structures or the influence of camera parameters, calibration with the common coordinate system, and the like, a captured image from the infra-cameras can be selected to allow efficient selection of position information with high accuracy. Further, a measurement error estimated position outputted from the position information determining unit can be corrected by using information on the work-allowed area presented by the map display device.

In this embodiment, the case of using the infra-cameras to obtain the estimated position of the measurement target object has been described. However, a LiDAR may also be used to obtain the estimated position.

Second Embodiment

Figure 10:
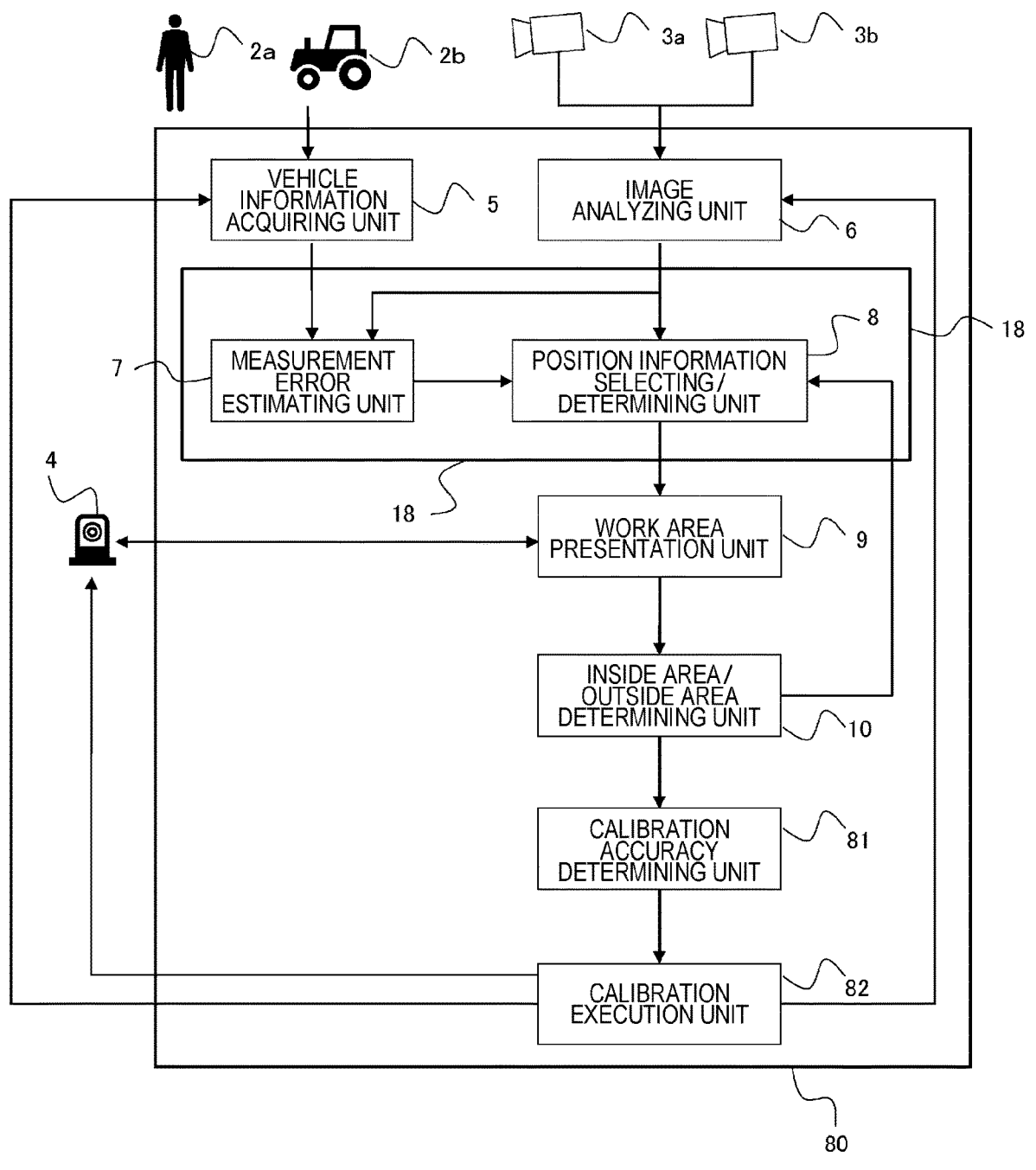
FIG. 10 is a functional block diagram showing functions of a position measurement system according to a second embodiment of the present invention.

A second embodiment of the present invention will then be described. FIG. 10 depicts functional blocks of the second embodiment.

A position measurement system 80 shown in FIG. 10 is a system that is based on the system of the first embodiment, with a new correction function is added thereto. The position measurement system 80 is characterized in that it selects an estimated position with high accuracy from estimated positions estimated by the infra-cameras, using information obtained by sensors incorporated in the vehicle 2b or the map display device 4 that displays a work-allowed area, and when necessary, corrects calibration information on calibration between the vehicle, the infra-camera, and the map display device.

In FIG. 10, the vehicle information acquiring unit 5, the image analyzing unit 6, the measurement error estimating unit 7, the position information selecting/determining unit 8, the work area presentation unit 9, and the inside area/outside area determining unit 10 are the same functions as those of the first embodiment.

In this embodiment, a calibration accuracy determining unit 81 and a calibration execution unit 82 are added to these functions. The calibration accuracy determining unit 81 has a function of storing information on whether a measurement target object is present in a work-allowed area, the information being outputted from the inside area/outside area determining unit 10 (information on "1" and "0" outputted by the inside area/outside area determining unit 10, as described above), for a given period and determining whether the calibration accuracy of any one of the vehicle 2b, the infra-cameras 3a and 3b, and the map display device 4 is sufficient. The calibration execution unit 82 has a function of instructing to execute calibration again when the calibration accuracy determining unit 81 determines that the calibration accuracy is insufficient. Hereinafter, the calibration accuracy determining unit 81 and the calibration execution unit 82 will be described.

The calibration accuracy determining unit 81 determines whether the calibration accuracy is sufficient by the following method. In a situation, for example, where no structure or the like is present around the vehicle 2b and the reliability of own position information from the GPS sensor is high, if the vehicle 2b is constantly outside the work-allowed area, the calibration accuracy determining unit 81 can determine that the accuracy of calibration information on calibration between the map display device 4 and the common coordinate system 16 is insufficient.

Likewise, in a situation where the reliability of the own position information on the vehicle 2b is high, when the worker 2a is constantly outside the work-allowed area despite a determination that the vehicle 2b is present in the work-allowed area is made, the calibration accuracy determining unit 81 can determine that the accuracy of calibration information on calibration between the infra-cameras 3a and 3b and the common coordinate system 16 is insufficient.

By adopting a similar method, the accuracy of calibration information on calibration between the external sensor incorporated in the vehicle 2b and the common coordinate system 16 can also be determined.

Another method may also be adopted, according to which in a situation where the calibration accuracy determining unit 81 does not use work area information presented by the map display device 4 when determining calibration accuracy as the reliability of the own position information of the vehicle 2b remains high, if a measurement error between the own position and an estimated position of the vehicle 2b estimated by the infra-cameras 3a and 3b constantly arises, the calibration accuracy determining unit 81 can determine that the accuracy of calibration between the infra-cameras 3a and 3b and the common coordinate system 16 is insufficient.

When the calibration accuracy determining unit 81 determines that calibration accuracy is insufficient, the calibration execution unit 82 automatically executes correction of calibration information or notifies the user to perform recalibration. As an automatic calibration method, an image of the vehicle 2b capable of acquiring its own position information is captured when the vehicle travels in the work area within a range in which the reliability of the own position information does not drop, and calibration of the position measurement system is executed using the captured image.

For example, in a case of executing automatic calibration of the infra-cameras 3a and 3b and the common coordinate system 16, information on an estimated position acquired by the infra-cameras 3a and 3b at the same time the information on the own position of the vehicle 2b is acquired is stored, camera parameters that minimizes an error of position information in the common coordinate system 16 are estimated, and the calibration is executed.

In a case of executing automatic calibration of the map display device 4 and the common coordinate system 16, when whether the vehicle 2b is inside the work-allowed areas or outside the work-allowed areas is determined, an angle of view or distortion parameters of the map display device 4 that put the lower end position of the object area of the vehicle 2b at the midpoint of the divided area of the work-allowed area are estimated, and the calibration is executed.

According to this embodiment, by using information obtained by sensors incorporated in the vehicle or the map display device that displays the work-allowed area, a highly accurate estimated position can be selected from estimated positions obtained by the infra-camera and calibration information on calibration between the vehicle, the infra-cameras, and the map display device can be corrected when necessary.

It should be noted that the present invention is not limited to the above embodiments but includes various modifications. The above embodiments have been described in detail for easy understanding of the present invention, and are not necessarily limited to an embodiment including all constituent elements described above. Some constituent elements of a certain embodiment may be replaced with constituent elements of another embodiment, and a constituent element of another embodiment may be added to a constituent element of a certain embodiment. In addition, some of constituent elements of each embodiment can be deleted therefrom or add to or replaced with constituent elements of another embodiment.

REFERENCE SIGNS LIST 1 position measurement system
2a worker (different measurement target object)
2b vehicle (own position detecting measurement target object)
3a, 3b infra-camera
4 map display device
5 vehicle information acquiring unit 6 image analyzing unit
7 measurement error estimating unit
8 position information determining unit
9 work area presentation unit
10 inside area/outside area determining unit
11 own position information acquiring unit
12 external sensor information acquiring unit
20 image acquiring unit
21 object detection unit
22 position measurement unit
40 vehicle measurement error calculating unit
41 worker measurement error estimating unit
50 own position of the vehicle
51 estimated position of the vehicle
52 measurement error of the vehicle
53 estimated position of the worker
54 measurement error of the worker
60 divided area
61 work-allowed area for the worker
62 work-allowed area for the vehicle

The invention claimed is:

1. A position measurement system comprising a position measurement means that based on a captured image, measures a position of a measurement target object, wherein the position measurement means includes:

a plurality of imaging means that capture an image of an own position detecting measurement target object having an own position detection unit and an image of a different measurement target object having no own position detection unit;

an own position measurement means that obtains an own position of the own position detecting measurement target object, based on own position information from the own position detection unit;

an image analyzing means that estimates respective positions of the own position detecting measurement target object and the different measurement target object for each of captured images from the plurality of imaging means; and a position determining means that compares the own position of the own position detecting measurement target object, the own position being measured by the own position measurement means, with the estimated position of the own position detecting measurement target object, the estimated position being obtained by the image analyzing means for each of the captured images, and that according to a result of the comparison, selects and determines one of the estimated positions of the different measurement target object for each of the captured images.

2. The position measurement system according to claim 1, wherein the position determining means includes an own position measurement error estimating means that compares the own position of the own position detecting measurement target object, the own position being obtained by the own position measurement means, with the estimated position of the own position detecting measurement target object, the estimated position being obtained by the image analyzing means, to calculate an own position measurement error of the captured image.

3. The position measurement system according to claim 1, wherein the own position detecting measurement target object includes a sensor that acquires own position information indicating a current position and direction, and a sensor that acquires shape information indicating a shape of a structure or an obstacle present around the own position detecting measurement target object.

4. The position measurement system according to claim 1, wherein the image analyzing means detects the own position detecting measurement target object and the different measurement target object in the captured image to set detection frames, and obtains respective estimated positions of the own position detecting measurement target object and the different measurement target object, based on positions of the detection frames.

5. The position measurement system according to claim 1, wherein the position determining means selects the estimated position of the different measurement target object by using one or more of these pieces of information: imaging time information, information on a positional relationship between sun and the imaging means, information on a posture of the different measurement target object, information on density of surroundings of the different measurement target object, and information on concealment of the different measurement target object by an obstacle.

6. The position measurement system according to claim 2, wherein the position determining means includes a measurement target object measurement error estimating means that estimates a measurement error of the different measurement target object, using information on the own position measurement error obtained by the own position measurement error estimating means and information on a distance between the different measurement target object and the imaging means.

7. The position measurement system according to claim 6, wherein the position determining means includes a position information selecting/determining means that selects the different measurement target object with a smallest error among the measurement errors of the different measurement target objects in a plurality of the captured images, the different measurement target object being obtained by the measurement target object measurement error estimating means, and that determines the estimated position of the different measurement target object.

8. The position measurement system according to claim 7, wherein the position measurement means includes:

a map display means that divides a work area into a plurality of divided areas and that displays the divided areas on a work area surface; and a work area presentation means that, based on the own position of the own position detecting measurement target object and on the estimated position of the different measurement target object, gives the divided area as a work-allowed area, to the map display means, the divided area being an area where the own position detecting measurement target object and the different measurement target object are allowed to work, to display the work-allowed area on the work area surface.

9. The position measurement system according to claim 8, wherein the position measurement means further includes an inside area/outside area determining means that determines whether the own position detecting measurement target object or the measurement target object is present in the work-allowed area and that feeds a result of the determination back to the position information selecting/determining means.

10. The position measurement system according to claim 9, wherein the position measurement means includes:

a calibration accuracy determining means that determines accuracy of calibration between the own position detecting measurement target object, the map display means, and the imaging means, using at least determination information of the inside area/outside area determining means; and a calibration execution means that executes recalibration when calibration accuracy is insufficient.

11. A position measurement system comprising a position measurement means that measures a position of a measurement target object based on a captured image, wherein the position measurement means includes:

a plurality of imaging means that capture an image of an own position detecting measurement target object having an own position detection unit and an image of a different measurement target object having no own position detection unit;

an own position measurement means that obtains an own position of the own position detecting measurement target object, based on own position information from the own position detection unit;

a measurement target object position estimating means that obtains respective estimated positions of the own position detecting measurement target object and the different measurement target object, from the captured image from each of the imaging means;

a measurement error estimating means that compares the own position of the own position detecting measurement target object, the own position being measured by the own position measurement means, with the estimated position of the own position detecting measurement target object, the estimated position being estimated by the measurement target object position estimating means, to obtain a measurement error and that based on the measurement error, estimates a measurement error of the different measurement target object; and a position determining means that selects the different measurement target object with a measurement error estimated by the measurement error estimating means being small to determine an estimated position of the different measurement target object.

* * * * *